United States Patent
Li et al.

(10) Patent No.: US 10,984,267 B2
(45) Date of Patent: Apr. 20, 2021

(54) METHOD AND SYSTEM FOR IMAGING ACQUISITION

(71) Applicant: ZKTECO USA LLC, Fairfield, NJ (US)

(72) Inventors: Zhinong Li, Beijing (CN); Shanhui Ye, Jiangxi (CN)

(73) Assignee: ZKTECO USA LLC, Fairfield, NJ (US)

( * ) Notice: Subject to any disclaimer, the term of this patent is extended or adjusted under 35 U.S.C. 154(b) by 90 days.

(21) Appl. No.: 16/098,263

(22) PCT Filed: Mar. 31, 2017

(86) PCT No.: PCT/CN2017/079076
§ 371 (c)(1),
(2) Date: Nov. 1, 2018

(87) PCT Pub. No.: WO2018/176399
PCT Pub. Date: Oct. 4, 2018

(65) Prior Publication Data
US 2019/0122061 A1   Apr. 25, 2019

(51) Int. Cl.
*G06K 9/00* (2006.01)
*G06K 9/20* (2006.01)
*H04N 5/225* (2006.01)

(52) U.S. Cl.
CPC ..... *G06K 9/00892* (2013.01); *G06K 9/00885* (2013.01); *G06K 9/2027* (2013.01);
(Continued)

(58) Field of Classification Search
CPC .......... G06K 9/00892; G06K 9/00885; G06K 9/2027; G06K 9/00604; G06K 9/00013; G06K 9/00255; H04N 5/2256
(Continued)

(56) References Cited

U.S. PATENT DOCUMENTS

2005/0084137 A1* 4/2005 Kim ................... G06K 9/00597
382/115
2007/0116331 A1* 5/2007 Rowe ................. G06K 9/00046
382/127
(Continued)

FOREIGN PATENT DOCUMENTS

CN           2828935 Y    10/2006
CN         202041967 U    11/2011
(Continued)

OTHER PUBLICATIONS

International Search Report and Written Opinion dated Jan. 5, 2018 in International Application PCT/CN2017/079076.

*Primary Examiner* — Allen C Wong
(74) *Attorney, Agent, or Firm* — Pillsbury Winthrop Shaw Pittman LLP

(57) ABSTRACT

Embodiments of the present invention disclose an image capturing method and device, so as to capture different types of biometric characteristic image information rapidly by using a device that can be integrated easily. The method according to the embodiment of the present invention is applied to an image capturing device, and the method includes: turning on a first supplementary lighting source when it is detected through a range sensor that there is an object in a first capturing distance, the first supplementary lighting source being a light source for supplementarily lighting a first biometric characteristic; acquiring first biometric characteristic image information through an imaging element; turning on a second supplementary lighting source when it is detected through the range sensor that there is an object in a second capturing distance, the second supplementary lighting source being a light source for supplementarily lighting a second biometric characteristic; and acquiring second biometric characteristic image information through the imaging element. When acquiring an image, the (Continued)

imaging element cooperates with a corresponding supplementary lighting source, so as to acquire high-quality biometric characteristic image information. Moreover, the image capturing device uses one imaging element and avoids using multiple imaging elements, thus facilitating integration of the device.

14 Claims, 6 Drawing Sheets

(52) U.S. Cl.
CPC ....... *H04N 5/2256* (2013.01); *G06K 9/00013* (2013.01); *G06K 9/00255* (2013.01); *G06K 9/00604* (2013.01)

(58) Field of Classification Search
USPC .......................................... 348/161
See application file for complete search history.

(56) References Cited

U.S. PATENT DOCUMENTS

| | | | |
|---|---|---|---|
| 2009/0268046 A1* | 10/2009 | Ogawa | H04N 5/2254 348/222.1 |
| 2015/0235017 A1* | 8/2015 | Oberheide | G06F 21/44 726/6 |
| 2016/0098603 A1* | 4/2016 | Kim | G06Q 30/0201 348/143 |
| 2016/0110533 A1 | 4/2016 | Berini et al. | |
| 2016/0148039 A1* | 5/2016 | Potash | G06F 21/36 382/119 |
| 2016/0259985 A1* | 9/2016 | Hanna | G06T 7/521 |

FOREIGN PATENT DOCUMENTS

| | | |
|---|---|---|
| CN | 105426848 A | 3/2016 |
| CN | 105956520 A | 9/2016 |
| CN | 105959592 A | 9/2016 |
| CN | 107223258 A | 9/2017 |

\* cited by examiner

METHOD AND SYSTEM FOR IMAGING ACQUISITION

CROSS REFERENCE TO RELATED APPLICATION

This application is a national stage application, filed under 35 U.S.C. § 371, of International Application No. PCT/CN2017/079076, filed on Mar. 31, 2017, which is hereby incorporated by reference in its entirety.

TECHNICAL FIELD

The present invention relates to the field of information acquisition, and in particular, to an image capturing method and device.

BACKGROUND ART

The biometric identification technology is widely applied in various fields. Various biometric identification apparatuses have appeared. Moreover, apparatuses that perform combined authentication by using multiple biometric characteristics have emerged gradually. The apparatus is referred to as a multi-modal biometric identification apparatus. The multi-modal biometric identification apparatus can capture multiple biometric characteristics.

An existing measure is to capture multiple biometric characteristics by using multiple image apparatuses respectively, so as to acquire different types of biometric characteristic image information.

For example, capturing of a palm image and a face image is implemented by using two devices or implemented in a time-sharing manner by using two Complementary Metal-Oxide Semiconductors (CMOSs) installed on the same device.

Each image capturing device or CMOS needs to be connected to a control unit separately to capture images. Alternatively, multiple CMOSs for image capturing are connected to a control unit in a time-sharing manner through switching, so as to capture images.

In the existing capturing method, multiple imaging devices are used to capture different types of biometric characteristic image information or multiple CMOSs are switched to capture different types of biometric characteristic image information in a time-sharing manner. As a result, the capturing time is too long, and many device components are adverse to device integration.

SUMMARY OF THE INVENTION

Embodiments of the present invention provide an image capturing method and device, so as to capture different types of biometric characteristic image information rapidly by using a device that can be integrated easily.

In order to solve the foregoing technical problem, the embodiments of the present invention provide the following technical solution:

An image capturing method, wherein the method is applied to an image capturing device, the image capturing device includes an imaging element, a range sensor, a first supplementary lighting source and a second supplementary lighting source, and the method includes:

turning on the first supplementary lighting source when it is detected through the range sensor that there is an object in a first capturing distance, the first supplementary lighting source being a light source for supplementarily lighting a first biometric characteristic;

acquiring first biometric characteristic image information through the imaging element;

turning on the second supplementary lighting source when it is detected through the range sensor that there is an object in a second capturing distance, the second supplementary lighting source being a light source for supplementarily lighting a second biometric characteristic; and acquiring second biometric characteristic image information through the imaging element.

In order to solve the foregoing technical problem, the embodiments of the present invention further provide the following technical solution:

An image capturing device, wherein the image capturing device includes an imaging element, a range sensor, a first supplementary lighting source and a second supplementary lighting source, and the device includes:

a turn-on unit configured to turn on the first supplementary lighting source when it is detected through the range sensor that there is an object in a first capturing distance, the first supplementary lighting source being a light source for supplementarily lighting a first biometric characteristic; and an image acquisition unit configured to acquire first biometric characteristic image information through the imaging element;

wherein the turn-on unit is further configured to turn on the second supplementary lighting source when it is detected through the range sensor that there is an object in a second capturing distance, the second supplementary lighting source being a light source for supplementarily lighting a second biometric characteristic; and the image acquisition unit is further configured to acquire second biometric characteristic image information through the imaging element.

It can be seen from the foregoing technical solutions that the embodiments of the present invention have the following advantages:

The image capturing device includes an imaging element, a range sensor, a first supplementary lighting source and a second supplementary lighting source. The image capturing device turns on the first supplementary lighting source when it is detected through the range sensor that there is an object in a first capturing distance, the first supplementary lighting source being a light source for supplementarily lighting a first biometric characteristic, thereby acquiring first biometric characteristic image information through the imaging element. As such, the first biometric characteristic is illuminated by the first supplementary lighting source, so that the imaging element can acquire an image with high imaging quality. The image capturing device turns on the second supplementary lighting source when it is detected through the range sensor that there is an object in a second capturing distance, the second supplementary lighting source being a light source for supplementarily lighting a second biometric characteristic, thereby acquiring second biometric characteristic image information through the imaging element. As such, the second biometric characteristic is illuminated by the second supplementary lighting source, so that the imaging element can acquire an image with high imaging quality. Through the range sensor, a specific biometric characteristic type can be determined. Therefore, when acquiring an image, the imaging element cooperates with a corresponding supplementary lighting source, so as to acquire high-quality biometric characteristic image information. Moreover, the image capturing device can acquire different types of biometric characteristic image information by using one imaging element, thus implementing rapid acquisition of different types of biometric characteristic image information. Moreover, the image capturing device avoids using multiple imaging elements, thus facilitating integration of the device.

DETAILED DESCRIPTION

The terms such as "first", "second", "third" and "fourth" (if any) in the specification, the claims, and the accompanying drawings of the present invention are merely used to distinguish similar objects, and are not necessarily used to describe a specific sequence or order. It should be understood that the data used in this manner can be interchanged in a proper case, so that the embodiments of the present invention described here can be implemented in sequences different from the content shown or described here. Moreover, the terms "include" and "have" as well as any of their variations are intended to cover a non-exclusive inclusion. For example, a process, method, system, product or device including a series of steps or units not only includes the steps or units clearly listed, but also can include other steps or units not clearly listed or other steps or units inherent to the process, method, product or device.

The embodiments of the present invention provide an image capturing method and device, so as to capture different types of biometric characteristic image information rapidly by using a device that can be integrated easily.

An embodiment of the present invention provides an image capturing device. The image capturing device includes an imaging element, a range sensor, a first supplementary lighting source and a second supplementary lighting source. The imaging element may be an imaging device such as a Charge Coupled Device (CCD) or a Complementary Metal-Oxide Semiconductor (CMOS). The first supplementary lighting source and the second supplementary lighting source can be used for supplementarily lighting different biometric characteristics respectively, so that the imaging element acquires corresponding biometric characteristic image information meeting a preset quality requirement.

For example, the biometric characteristic image information includes a face image, a palm image, an iris image and a fingerprint image, the first biological image and the second biometric characteristic image information each being one type of the biometric characteristic. The supplementary lighting source includes a face supplementary lighting source, a palm supplementary lighting source, an iris supplementary lighting source, and a fingerprint supplementary lighting source, the first supplementary lighting source and the second supplementary lighting source each being one type of the supplementary lighting source.

In the embodiment of the present invention, the imaging element is a CMOS with a resolution ratio greater than a preset threshold, so that images meeting a high quality requirement can be acquired through the CMOS. The image capturing device further includes a wide-angle optical lens, and the CMOS acquires images through the wide-angle optical lens, so that the image capturing device has a wide capturing range.

Figure 1:
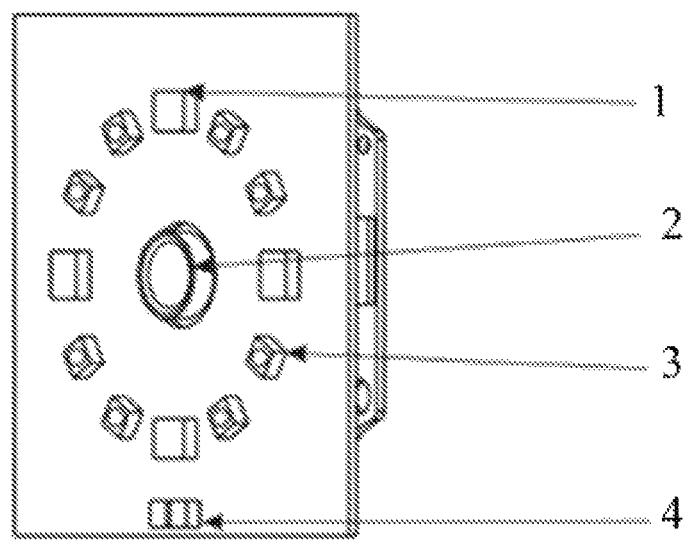
FIG. 1 is a schematic diagram of a partial structure of an image capturing device according to an embodiment of the present invention.
Figure 2:
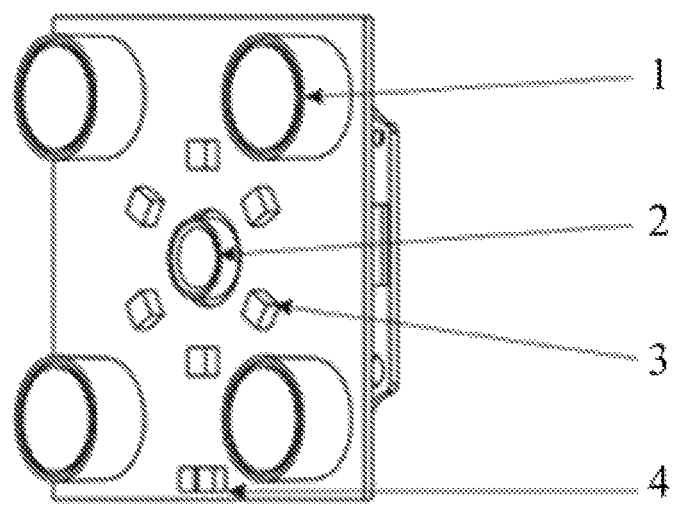
FIG. 2 is another schematic diagram of a partial structure of an image capturing device according to an embodiment of the present invention.

FIG. 1 and FIG. 2 are schematic diagrams of a partial structure of an image capturing device according to an embodiment of the present invention. FIG. 1 shows one specific structural form, and FIG. 2 shows another specific structural form. As shown in FIG. 1 and FIG. 2, a face supplementary lighting source 1, a palm supplementary lighting source 3, a lens 2 and a range sensor 4 are disposed on a housing of the image capturing device. An imaging element of the image capturing device acquires images through the lens 2. There may be one or more face supplementary lighting sources 1 and/or palm supplementary lighting sources 3. In order to enable the imaging element to acquire uniform image parameters such as color and brightness, the supplementary lighting sources on the housing can be disposed on periphery of the lens. Different supplementary lighting sources can be disposed on the same circumference, as shown in FIG. 1, or disposed on different circumferences, as shown in FIG. 2. The range sensor can be configured to distinguish different biometric characteristic modes, thereby controlling an active supplementary lighting module of a corresponding mode, so as to capture images.

Figure 3:
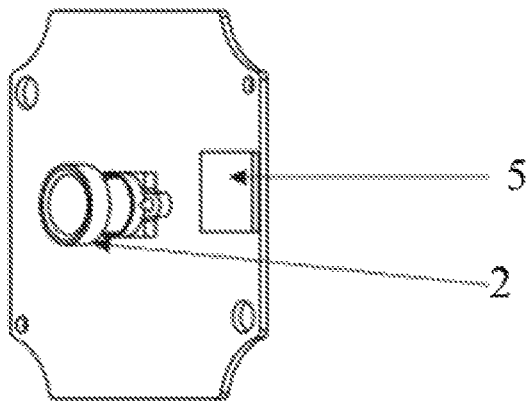
FIG. 3 is another schematic diagram of a partial structure of an image capturing device according to an embodiment of the present invention.

The image capturing device can be further provided with a control unit, such as a CPU. As shown in FIG. 3, a CPU 5 is disposed on the housing of the image capturing device, so that operations of components such as the range sensor, the supplementary lighting source, and the imaging element can be controlled through the CPU 5, thus improving execution efficiency of the image capturing method provided in the embodiment of the present invention. An integration level of the image capturing device is also improved, so that the device is applicable to multiple scenarios.

The image capturing device includes an imaging element, a range sensor, a first supplementary lighting source and a second supplementary lighting source. The image capturing device turns on the first supplementary lighting source when it is detected through the range sensor that there is an object in a first capturing distance, the first supplementary lighting source being a light source for supplementarily lighting a first biometric characteristic, thereby acquiring first biometric characteristic image information through the imaging element. As such, the first biometric characteristic is illuminated by the first supplementary lighting source, so that the imaging element can acquire an image with high imaging quality. The image capturing device turns on the second supplementary lighting source when it is detected through the range sensor that there is an object in a second capturing distance, the second supplementary lighting source being a light source for supplementarily lighting a second biometric characteristic, thereby acquiring second biometric characteristic image information through the imaging element. As such, the second biometric characteristic is illuminated by the second supplementary lighting source, so that the imaging element can acquire an image with high imaging quality. Through the range sensor, a specific biometric characteristic type can be determined. Therefore, when acquiring an image, the imaging element cooperates with a corresponding supplementary lighting source, so as to acquire high-quality biometric characteristic image information. Moreover, the image capturing device can acquire different types of biometric characteristic image information by using one imaging element, thus implementing rapid acquisition of different types of biometric characteristic image information. Moreover, the image capturing device avoids using multiple imaging elements, thus facilitating integration of the device.

Figure 4:
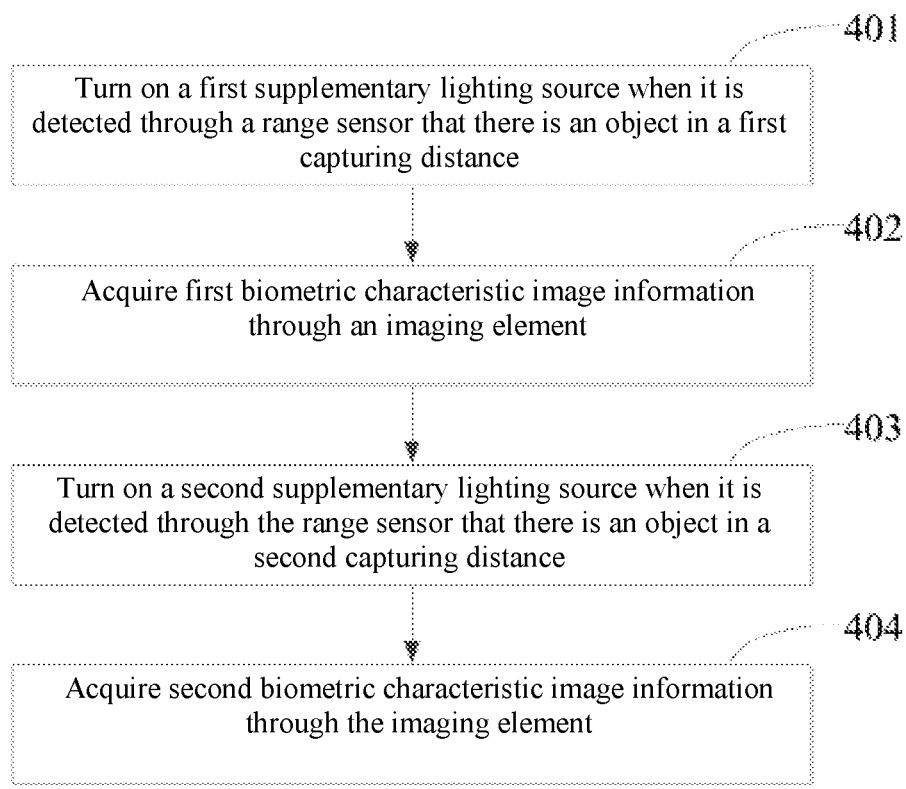
FIG. 4 is a method flowchart of an image capturing method according to an embodiment of the present invention.

FIG. 4 is a method flowchart of an image capturing method according to an embodiment of the present invention. The method is applicable to the image capturing device shown in FIG. 1 or FIG. 2. The image capturing device includes an imaging element, a range sensor, a first supplementary lighting source and a second supplementary lighting source. The method in the embodiment of the present invention includes the following steps:

Step 401: Turn on the first supplementary lighting source when it is detected through the range sensor that there is an object in a first capturing distance, the first supplementary lighting source being a light source for supplementarily lighting a first biometric characteristic.

Step 402: Acquire first biometric characteristic image information through the imaging element.

Step 403: Turn on the second supplementary lighting source when it is detected through the range sensor that there is an object in a second capturing distance, the second supplementary lighting source being a light source for supplementarily lighting a second biometric characteristic.

Step 404: Acquire second biometric characteristic image information through the imaging element.

Optionally, before the step of acquiring first biometric characteristic image information through the imaging element, the method in the embodiment of the present invention further includes:

acquiring a first imaging element parameter, the first imaging element parameter being an imaging element parameter adapted to imaging of the first biometric characteristic;

the step of acquiring first biometric characteristic image information through the imaging element includes:

acquiring the first biometric characteristic image information through the imaging element by using the first imaging element parameter;

before the step of acquiring second biometric characteristic image information through the imaging element, the method in the embodiment of the present invention further includes:

acquiring a second imaging element parameter, the second imaging element parameter being an imaging element parameter adapted to imaging of the second biometric characteristic; and the step of acquiring second biometric characteristic image information through the imaging element includes:

acquiring the second biometric characteristic image information through the imaging element by using the second imaging element parameter.

Optionally, before the step of acquiring the first biometric characteristic image information through the imaging element by using the first imaging element parameter, the method in the embodiment of the present invention further includes:

initializing the imaging element;

loading the first imaging element parameter to the initialized imaging element; and before the step of acquiring the second biometric characteristic image information through the imaging element by using the second imaging element parameter, the method in the embodiment of the present invention further includes:

switching the first imaging element parameter loaded on the initialized imaging element to the second imaging element parameter.

Optionally, the step of acquiring a first imaging element parameter includes:

calling a pre-stored first imaging element parameter to initialize the imaging element; and before the step of acquiring the second biometric characteristic image information through the imaging element by using the second imaging element parameter, the method in the embodiment of the present invention further includes:

switching the first imaging element parameter loaded on the initialized imaging element to the second imaging element parameter.

Optionally, before the step of turning on the first supplementary lighting source, the method in the embodiment of the present invention further includes:

acquiring first image prediction information through the imaging element;

judging whether the first image prediction information is an image of the first biometric characteristic or a human body image; and if the first image prediction information is an image of the first biometric characteristic or a human body image, performing the step of turning on the first supplementary lighting source;

and/or before the step of turning on the second supplementary lighting source, the method in the embodiment of the present invention further includes:

acquiring second image prediction information through the imaging element;

judging whether the second image prediction information is an image of the second biometric characteristic or a human body image; and if the second image prediction information is an image of the second biometric characteristic or a human body image, performing the step of turning on the second supplementary lighting source.

Optionally, after the step of acquiring first biometric characteristic image information through the imaging element, the method in the embodiment of the present invention further includes:

identifying the first biometric characteristic image information to obtain a first identification result;

after the step of acquiring second biometric characteristic image information through the imaging element, the method in the embodiment of the present invention further includes:

identifying the second biometric characteristic image information to obtain a second identification result; and executing a preset operation according to the first identification result and/or the second identification result.

Optionally, the biometric characteristic image information includes a face image, a palm image, an iris image and a fingerprint image, the first biological image and the second biometric characteristic image information each being one type of the biometric characteristic, and the supplementary lighting source includes a face supplementary lighting source, a palm supplementary lighting source, an iris supplementary lighting source, and a fingerprint supplementary lighting source, the first supplementary lighting source and the second supplementary lighting source each being one type of the supplementary lighting source.

Optionally, the imaging element is a CMOS with a resolution ratio greater than a preset threshold, the image capturing device further includes a wide-angle optical lens, and the CMOS acquires images through the wide-angle optical lens.

In conclusion, the image capturing device includes an imaging element, a range sensor, a first supplementary lighting source and a second supplementary lighting source. The image capturing device turns on the first supplementary lighting source when it is detected through the range sensor that there is an object in a first capturing distance, the first supplementary lighting source being a light source for supplementarily lighting a first biometric characteristic, thereby acquiring first biometric characteristic image information through the imaging element. As such, the first biometric characteristic is illuminated by the first supplementary lighting source, so that the imaging element can acquire an image with high imaging quality. The image capturing device turns on the second supplementary lighting source when it is detected through the range sensor that there is an object in a second capturing distance, the second supplementary lighting source being a light source for supplementarily lighting a second biometric characteristic, thereby acquiring second biometric characteristic image information through the imaging element. As such, the second biometric characteristic is illuminated by the second supplementary lighting source, so that the imaging element can acquire an image with high imaging quality. Through the range sensor, a specific biometric characteristic type can be determined. Therefore, when acquiring an image, the imaging element cooperates with a corresponding supplementary lighting source, so as to acquire high-quality biometric characteristic image information. Moreover, the image capturing device can acquire different types of biometric characteristic image information by using one imaging element, thus implementing rapid acquisition of different types of biometric characteristic image information. Moreover, the image capturing device avoids using multiple imaging elements, thus facilitating integration of the device.

Figure 5:
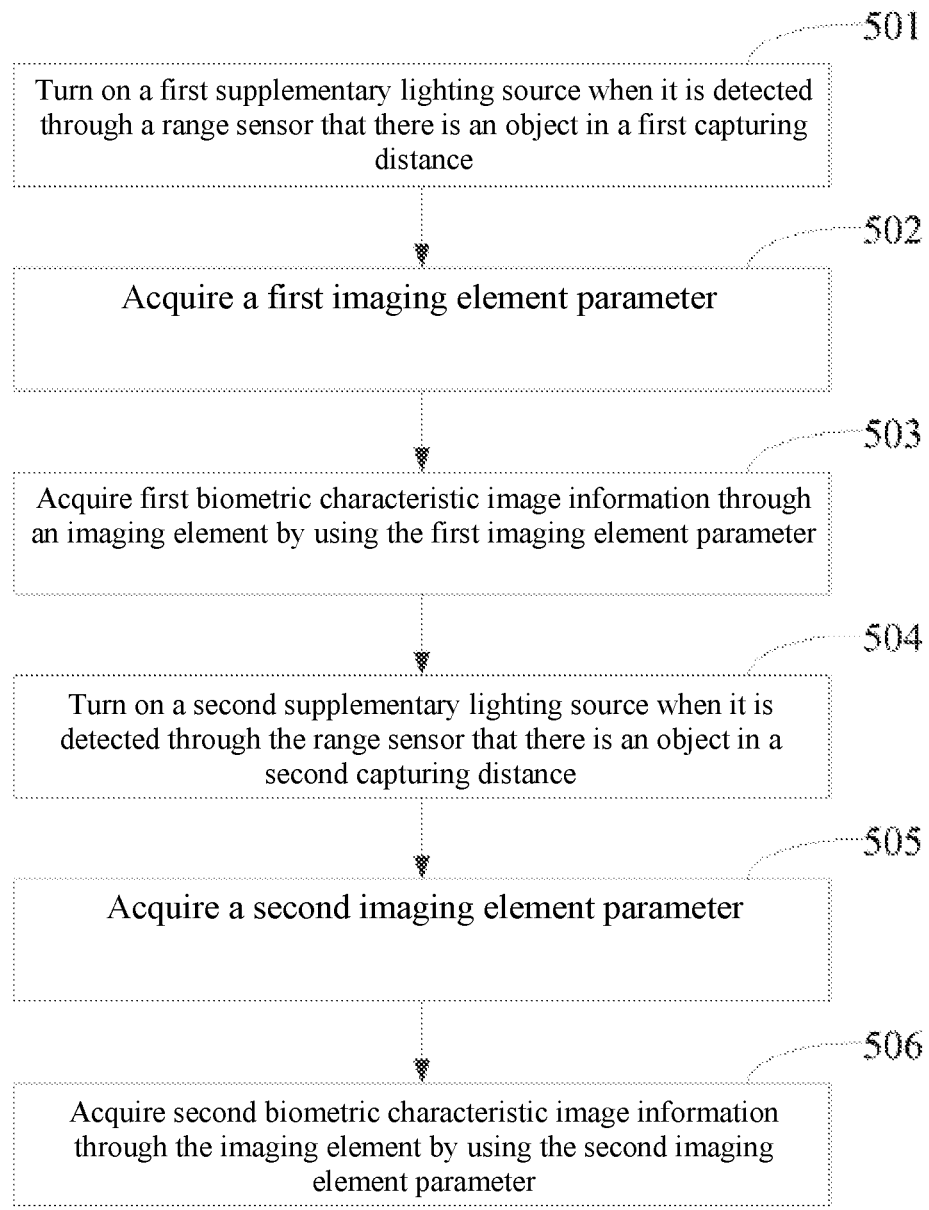
FIG. 5 is a method flowchart of an image capturing method according to an embodiment of the present invention.

FIG. 5 is a method flowchart of an image capturing method according to an embodiment of the present invention. The method is applicable to the image capturing device shown in FIG. 1 or FIG. 2. The image capturing device includes an imaging element, a range sensor, a first supplementary lighting source and a second supplementary lighting source. Referring to FIG. 4, the method in the embodiment of the present invention includes the following steps:

Step 501: Turn on the first supplementary lighting source when it is detected through the range sensor that there is an object in a first capturing distance.

The first supplementary lighting source is a light source for supplementarily lighting a first biometric characteristic. A capturing distance may be a specific distance value or a distance range, which is not specifically limited in the embodiment of the present invention.

The range sensor of the image capturing device performs real-time monitoring in a preset range. When the range sensor detects that there is an object in the first capturing distance, it indicates that the image capturing device needs to acquire an image of a first biometric characteristic corresponding to the first capturing distance. Therefore, the image capturing device turns on the first supplementary lighting source used for supplementarily lighting the first biometric characteristic, so as to prepare for acquisition of the first biometric characteristic image information.

For example, a user to be identified approaches the image capturing device. When the range sensor of the image capturing device detects that there is an object (that is, the face of the user) within a range of 30 cm to 100 cm from the image capturing device, a CPU of the image capturing device turns on a face supplementary lighting source. The face supplementary lighting source may be a near-infrared light source, for example, a light source with a wavelength of 940 nm. Face infrared light has a small emission angle, such as 60 degrees, and has a long irradiation distance.

Step 502: Acquire a first imaging element parameter.

The first imaging element parameter is an imaging element parameter adapted to imaging of a first biometric characteristic.

When the range sensor detects that there is an object in the first capturing distance, in order to acquire an image meeting a preset quality requirement, the image capturing device further needs to acquire a first imaging element parameter corresponding to the first biometric characteristic. Because different biometric characteristics correspond to different capturing distances, different biometric characteristics have different imaging sizes in the entire capturing region. Therefore, imaging element parameters of the imaging element, such as an exposure (AEC) parameter and a gain (AGC) parameter, are set differently. The first imaging element parameter as well as a corresponding relationship among the first capturing distance, the first supplementary lighting source and the first imaging element parameter are preset on the image capturing device. When the range sensor detects that there is an object in the first capturing distance, the image capturing device can acquire the first supplementary lighting source and the first imaging element parameter from the corresponding relationship according to the first capturing distance, thereby turning on the first supplementary lighting source and acquiring the first imaging element parameter.

For example, a palm and a face have different capturing distances with respect to the CMOS. Therefore, an image of the face is much smaller than that of the palm in the entire capturing region, and hence an exposure (AEC) parameter, a gain (AGC) parameter, a contrast ratio (Contrast), an imaging window (Window) size, and the like of the CMOS are set differently. The exposure (AEC) parameter, gain (AGC) parameter, contrast ratio (Contrast), imaging window (Window) size, and the like are parameters of the CMOS.

Step 503: Acquire first biometric characteristic image information through the imaging element by using the first imaging element parameter.

After acquiring the first imaging element parameter, the image capturing device can acquire the first biometric characteristic image information through the imaging element according to the setting of the first imaging element. The setting of the first capturing distance corresponds to the distance suitable for capturing an image of the first biometric characteristic, the first supplementary lighting source is a light source for supplementarily lighting the first biometric characteristic, and the first imaging element parameter is a parameter suitable for the imaging element to acquire the image of the first biometric characteristic. Therefore, in coordination with the first capturing distance, the first supplementary lighting source and the first imaging element parameter, the imaging element can acquire first biometric characteristic image information whose quality meets the requirement.

For example, when the face of the user is located in a range of 30 cm to 100 cm from the image capturing device, the image capturing device turns on an infrared supplementary lighting source for supplementarily lighting the face. At the same time, a CMOS parameter that is set for acquisition of a face image is acquired. By using the CMOS parameter, the CMOS can acquire a high-quality face image that receives supplementary lighting from the infrared supplementary lighting source.

Figure 8:
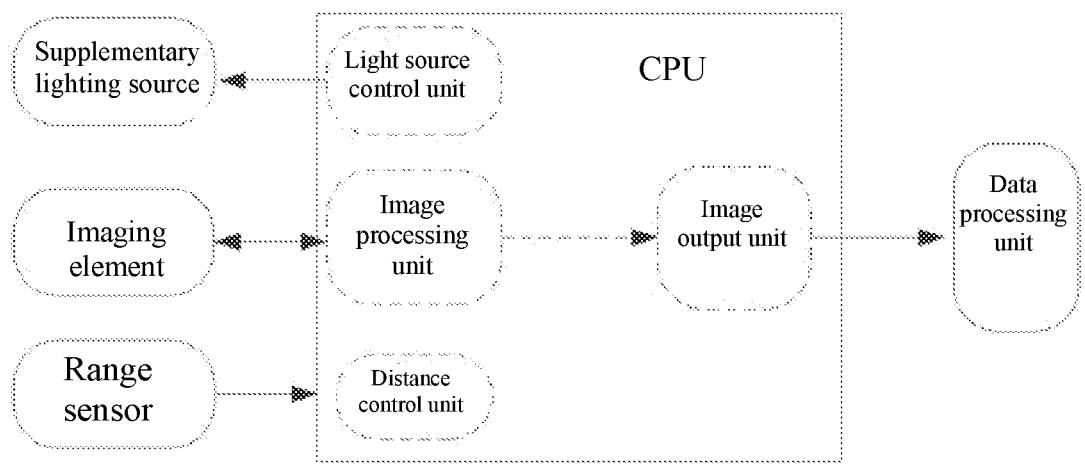
FIG. 8 is a schematic diagram of a hardware execution process of the embodiment shown in FIG. 5.

In a specific execution process, for example, referring to FIG. 8, when detecting that a biometric characteristic appears in a preset distance range, the range sensor sends a probe parameter to a control unit in the CPU, thereby activating the control unit in the CPU to turn on an active supplementary lighting unit. Meanwhile, an image processing unit inside the CPU captures a biometric characteristic image. After passing through the image processing unit in the CPU, the image is output by an image output unit inside the CPU to a data storage unit for storage, so as to be provided to a related device.

Optionally, in order to improve execution efficiency, avoid performing complex calculation after acquiring an unmatched image, or acquire a required image accurately, before the first supplementary lighting source is turned on, the method in the embodiment of the present invention further includes the following steps:

Step A1: Acquire first image prediction information through the imaging element.

When it is detected through the range sensor that there is an object in the first capturing distance, the image capturing device first acquires an image of the object within the first capturing distance through the imaging element rapidly, thereby preliminarily making a prediction through the image whether the image is a first biological image.

In the embodiment of the present invention, during performing of step A1, the first supplementary lighting source is turned on and off rapidly, and/or a first imaging element parameter is acquired, so that the imaging element acquires a high-quality first biological image by using the first imaging element parameter, thus making a prediction with high accuracy.

Step A2: Judge whether the first image prediction information is an image of the first biometric characteristic or a human body image. If the first image prediction information is an image of the first biometric characteristic or a human body image, perform the step of turning on the first supplementary lighting source.

After acquiring the first image prediction information, the image capturing device judges whether the first image prediction information is an image of the first biometric characteristic, or directly identifies whether the first image prediction information is a human body in a human body characteristic identification scenario. If it is identified that the first image prediction information is an image of the first biometric characteristic or a human body image, the step of turning on the first supplementary lighting source, that is, step 501, is performed. Hence, steps 502 and 503 are performed subsequently. In step A2, simple identification may be performed by using a simple algorithm, for example, using a probe algorithm (which implements fuzzy judgment with a high speed). In this case, the acquired image does not need to meet a high quality requirement. Step 503 is performed only after the identification succeeds, for example, an identification algorithm (precise judgment) is executed. When a complex algorithm or other preset operations are executed in step 503, the probability of failure can be reduced, thus improving the execution efficiency of the method in the embodiment of the present invention.

For example, when the range sensor detects an object within a range of 30 cm to 100 cm, the image capturing device acquires first image prediction information through the imaging element, and then identifies whether the image is a face or a human body characteristic; if yes, the image capturing device performs the step of turning on the first supplementary lighting source, so as to acquire first biometric characteristic image information through the imaging element by using the first imaging element parameter. If it is identified that the image is not a face or a human body characteristic, it indicates that the object is not a face image to be acquired, and therefore step 501 to step 503 are not performed.

In some embodiments of the present invention, the imaging element is a CMOS with a resolution ratio greater than a preset threshold, the image capturing device further includes a wide-angle optical lens, and the CMOS acquires images through the wide-angle optical lens. Therefore, the image capturing device can acquire high-resolution ratio images through the imaging element and the lens, and has a wide image acquisition range.

Step 504: Turn on the second supplementary lighting source when it is detected through the range sensor that there is an object in a second capturing distance.

The second supplementary lighting source is a light source for supplementarily lighting a second biometric characteristic.

For step 504, reference can be made to the detailed description of step 501.

For example, a user to be identified approaches the image capturing device. When the range sensor of the image capturing device detects that there is an object within a range of 5 cm to 20 cm from the image capturing device, for example, the user displays the palm at a distance of 10 cm from the image capturing device, the image capturing device turns on a palm supplementary lighting source. The palm supplementary lighting source is a near-infrared light source, that is, a light source with a wavelength of 940 nm. Palm infrared light has a large emission angle, such as 140 degrees, and has a short irradiation distance.

Step 505: Acquire a second imaging element parameter.

The second imaging element parameter is an imaging element parameter adapted to imaging of the second biometric characteristic.

For step 505, reference can be made to the detailed description of step 502.

Step 506: Acquire the second biometric characteristic image information through the imaging element by using the second imaging element parameter.

For step 506, reference can be made to the detailed description of step 503.

For example, when the palm of the user is located in a range of 5 cm to 20 cm from the image capturing device, the image capturing device turns on an infrared supplementary lighting source for supplementarily lighting the palm. At the same time, a CMOS parameter that is set for acquisition of a face image is acquired. By using the CMOS parameter, the CMOS can acquire a high-quality face image that receives supplementary lighting from the infrared supplementary lighting source.

Optionally, in order to improve execution efficiency, avoid performing complex calculation after acquiring an unmatched image, or acquire a required image accurately, before the second supplementary lighting source is turned on, the method in the embodiment of the present invention further includes the following steps:

Step B1: Acquire second image prediction information through the imaging element.

For step B1, reference can be made to the detailed description of step A1.

Step B2: Judge whether the second image prediction information is an image of the second biometric characteristic or a human body image; and if the second image prediction information is an image of the second biometric characteristic or a human body image, perform the step of turning on the second supplementary lighting source.

For step B2, reference can be made to the detailed description of step A2.

As such, by performing step 501 to step 506, the image capturing method in the embodiment of the present invention can capture two types of biometric characteristic images with high imaging quality by using one imaging element. Only one imaging element is used, and other parts only need to be disposed surrounding the imaging element. Therefore, compared with a device using multiple imaging elements, the image capturing device in the embodiment of the present invention can reduce the number of components of the image capturing device, thus facilitating miniaturization, and can acquire different biometric characteristic images rapidly.

In some embodiments of the present invention, because different types of biometric characteristic image information is acquired through the same imaging element, a background during capturing of the first biometric characteristic image information is usually the same as a background during capturing of the second biometric characteristic image information, and the background can be used as a condition for determining whether the users are the same. The method in the embodiment of the present invention can provide a user identification function.

The image capturing device in the embodiment of the present invention only needs one imaging element to acquire the first biometric characteristic image information and the second biometric characteristic image information. The imaging element is initialized only once. Therefore, compared with a capturing device in which imaging element initialization needs to be performed twice, the image capturing device in the embodiment of the present invention can acquire different types of biometric characteristic image information rapidly.

A specific process of initializing the imaging element is as follows:

before the step of acquiring the first biometric characteristic image information through the imaging element by using the first imaging element parameter, the method in the embodiment of the present invention further includes: initializing the imaging element; and loading the first imaging element parameter to the initialized imaging element.

For example, when it is detected through the range sensor that there is an object in the first capturing distance, the image capturing device is triggered to initialize the imaging element, then acquire a pre-stored first imaging element parameter, and load the first imaging element parameter to the initialized imaging element. Hence, the first biometric characteristic image information is acquired through the imaging element by using the first imaging element parameter.

As such, before the step of acquiring the second biometric characteristic image information through the imaging element by using the second imaging element parameter, the method in the embodiment of the present invention further includes: switching the first imaging element parameter loaded on the initialized imaging element to the second imaging element parameter. Hence, the image capturing device subsequently acquires the second biometric characteristic image information through the imaging element by using the second imaging element parameter.

Alternatively, the method in the embodiment of the present invention can also load the first imaging element parameter when initializing the imaging element. Specifically, an execution process is as follows:

The step of acquiring a first imaging element parameter includes: calling a pre-stored first imaging element parameter to initialize the imaging element. Hence, the image capturing device subsequently acquires the first biometric characteristic image information through the imaging element by using the first imaging element parameter.

That is, during initialization of the imaging element, the pre-stored first imaging element parameter is directly called to complete the initialization action. In such a manner, the initialization action is combined with the acquisition of the first imaging element parameter, so that the method in the embodiment of the present invention can acquire images more rapidly.

Then, before the step of acquiring the second biometric characteristic image information through the imaging element by using the second imaging element parameter, the method in the embodiment of the present invention further includes:

switching the first imaging element parameter loaded on the initialized imaging element to the second imaging element parameter. Hence, the image capturing device subsequently acquires the second biometric characteristic image information through the imaging element by using the second imaging element parameter.

The initialization in the field of computer programming refers to the method of assigning an initial value to a data object or a variable.

Figure 6A:
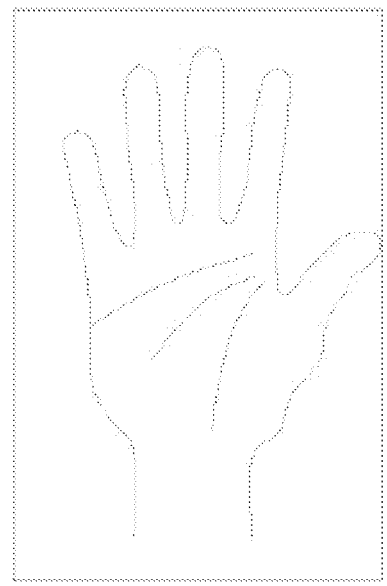
FIG. 6a is an example of a biological image acquired in the embodiment shown in FIG. 5.
Figure 6B:
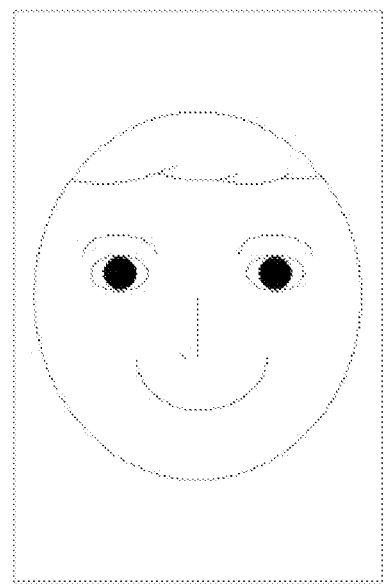
FIG. 6b is an example of another biological image acquired in the embodiment shown in FIG. 5.
Figure 7:
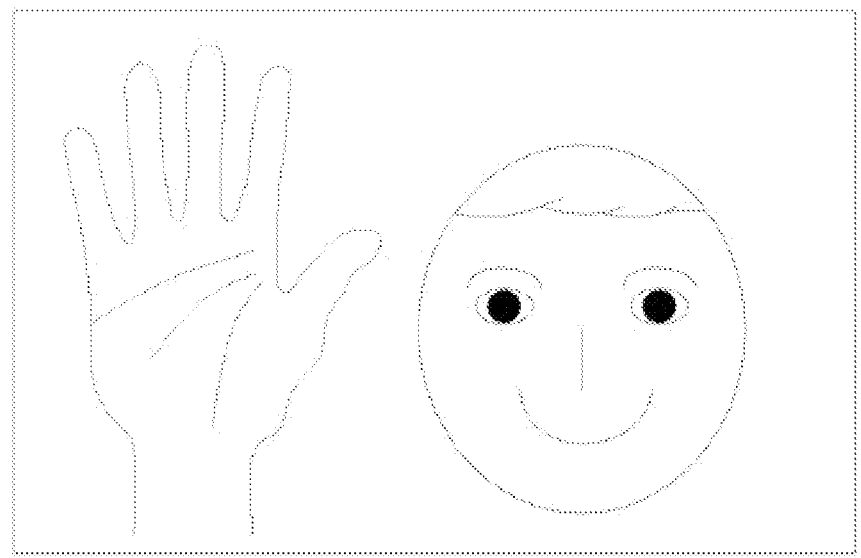
FIG. 7 is an example of two biological images acquired simultaneously in the embodiment shown in FIG. 5.

By executing the foregoing method, the image capturing device only needs to initialize the imaging element before image acquisition for the first time in the image capturing method in the embodiment of the present invention. Before image acquisition for the second time, the image capturing device does not need to initialize the imaging element again, thus improving an image acquisition speed. Images acquired in such a manner may be in the form as shown in FIG. 6a or FIG. 6b, that is, each image is a biometric characteristic, i.e., the images are captured step by step, or may be in the form of an image obtained after first biometric characteristic information and second biometric characteristic information are integrated as shown in FIG. 7, that is, the images are captured simultaneously. If different images are acquired by using two imaging elements or two image capturing devices respectively, initialization needs to be performed twice for the imaging elements, thus lowering the image capturing speed.

The method in the embodiment of the present invention has two manners for initializing the imaging element. In one manner, the imaging element is initialized first, and then the acquired first imaging element parameter is loaded to the imaging element. In the other manner, the pre-stored first imaging element parameter is called during initialization of the imaging element, so as to complete the initialization action. When the initialization is completed, the imaging element also completes loading of the first imaging element parameter. As can be seen, the latter solution is more efficient and faster in execution compared with the former solution. However, no matter which initialization manner is used, the imaging element does not need to be initialized again before acquisition of the second biometric characteristic image subsequently, and it is only necessary to switch the first imaging element parameter to the second imaging element parameter. Therefore, compared with the solution of performing initialization twice, the method in the embodiment of the present invention reduces the initialization time and can still acquire images more rapidly.

Regardless of a single imaging element or double imaging elements, only one type of image can be captured each time in a capturing region during capturing of the palm and the face. It is necessary to switch between two modes through algorithm-based judgment or a probe signal. When double imaging elements are used, a corresponding imaging element needs to be turned on to acquire an image after the judgment is finished. It is necessary to initialize the corresponding imaging element, download a corresponding imaging parameter, and then acquire an image, which takes a long time. When a single imaging element is used, the single CMOS does not need to be switched, and initialization only needs to be performed once. It is only necessary to perform parameter conversion based on probe data to directly switch imaging parameters according to a probe signal, thus reducing the capturing time.

In some embodiments of the present invention, the acquired biometric characteristic image information further needs to be used. For example, the biometric characteristic image information is identified, so that a preset operation is performed according to an identification result. That is, the first biometric characteristic image information is acquired in step 503 and the second biometric characteristic image information is acquired in step 506.

After the step of acquiring first biometric characteristic image information through the imaging element by using the first imaging element parameter, the method in the embodiment of the present invention further includes: identifying the first biometric characteristic image information to obtain a first identification result.

after the step of acquiring second biometric characteristic image information through the imaging element by using the second imaging element parameter, the method in the embodiment of the present invention further includes: identifying the second biometric characteristic image information to obtain a second identification result.

Therefore, the image capturing device can execute a preset operation according to the first identification result and/or the second identification result. As such, integrated identification can be implemented.

The identification result can be, for example, that the identification succeeds or the identification fails.

For example, after acquiring a face image and a palm image through the foregoing steps, the image capturing device performs facial identification on the face image by using a pre-stored face template, and the facial identification succeeds if a characteristic similarity degree of the face template with respect to the face image meets a preset requirement; otherwise, the facial identification fails. Moreover, the image capturing device performs palm print identification on the palm image by using a pre-stored palm print template, and the palm identification succeeds if a characteristic similarity degree of the palm template with respect to the palm image meets a preset requirement; otherwise, the palm identification fails. In some embodiments, the user passes the identification as long as one of the facial identification and the palm identification succeeds, thus improving execution efficiency of the identification operation. In some embodiments, the user passes the identification only when both the facial identification and the palm identification succeed, thus improving identification accuracy.

The images acquired in step 503 and step 506 may be two independent images, as shown in FIG. 6a and FIG. 6b. Then, identification characteristics can be extracted from the two images respectively. Alternatively, the image capturing device can integrate the two images through a processor, for example, as shown in FIG. 7, so that characteristics for facial identification and palm identification can be extracted from the image.

Using an example in which the first biometric characteristic is a face and the second biometric characteristic is a palm, the same CMOS used in the embodiment of the present invention can capture image information of the face and the palm rapidly. The range sensor is used to determine whether it is in a face state or a palm state, so that a CPU obtains a wakeup signal and opens a supplementary lighting source of a corresponding mode. A synchronous CPU calls CMOS parameters of different modes, thereby capturing images of the corresponding modes. As such, the face image and the palm image can be captured synchronously and integrated naturally, which significantly improves the identification rate and improve the anti-counterfeiting capability of the product. Moreover, the method in the embodiment of the present invention helps reduce the cost and facilitates product miniaturization, so that the product can be embedded easily.

The embodiment of the present invention can capture images of the first biometric characteristic and the second biometric characteristic simultaneously. For example, the palm capturing and the face capturing are completed on the same CMOS. A distance detection apparatus is used to identify face and palm capturing positions, so as to achieve the objective of capturing the palm image and face images simultaneously. Subsequently, the palm identification characteristic and the face identification characteristic can further be integrated to achieve palm and face anti-counterfeiting functions and other functions. Therefore, the images acquired by the method in the embodiment of the present invention can be used as standard image templates of a security product, especially a human body biometric characteristic identification product, thus improving a comparison identification rate and passing rate of a security device and a human body biometric comparison device. The embodiment of the present invention can reduce the misjudgment rate, improve the reliability, and achieve effective anti-counterfeiting, so that the protection capability of a device executing the method in the embodiment of the present invention is greatly improved.

It can be understood that the biometric characteristic image information includes a face image, a palm image, an iris image and a fingerprint image, the first biological image and the second biometric characteristic image information each being one type of the biometric characteristic. The supplementary lighting source includes a face supplementary lighting source, a palm supplementary lighting source, an iris supplementary lighting source, and a fingerprint supplementary lighting source, the first supplementary lighting source and the second supplementary lighting source each being one type of the supplementary lighting source.

That is, the image capturing device provided in the embodiment of the present invention can acquire multiple types of biometric characteristic image information, and correspondingly, there are multiple types of supplementary lighting sources for supplementary lighting. A specific device can be configured according to a requirement of the user.

It can be understood that, in some embodiments of the present invention, the imaging element parameter may not be distinguished from each other; the image capturing device is capable of acquiring corresponding high-quality biometric characteristic images based on different modes of the supplementary lighting source. However, images with higher quality can be captured by using different imaging element parameters.

In conclusion, the image capturing device includes an imaging element, a range sensor, a first supplementary lighting source and a second supplementary lighting source. The image capturing device turns on the first supplementary lighting source when it is detected through the range sensor that there is an object in a first capturing distance, the first supplementary lighting source being a light source for supplementarily lighting a first biometric characteristic. The image capturing device further acquires a first imaging element parameter, the first imaging element parameter being an imaging element parameter adapted to imaging of the first biometric characteristic, thereby acquiring first biometric characteristic image information through the imaging element by using the first imaging element parameter. As such, the first biometric characteristic is illuminated by the first supplementary lighting source, so that the imaging element using the first imaging element parameter can acquire an image with high imaging quality. The image capturing device turns on the second supplementary lighting source when it is detected through the range sensor that there is an object in a second capturing distance, the second supplementary lighting source being a light source for supplementarily lighting a second biometric characteristic. The image capturing device further acquires a second imaging element parameter, the second imaging element parameter being an imaging element parameter adapted to imaging of the second biometric characteristic, thereby acquiring second biometric characteristic image information through the imaging element by using the second imaging element parameter. As such, the second biometric characteristic is illuminated by the second supplementary lighting source, so that the imaging element using the second imaging element parameter can acquire an image with high imaging quality. Through the range sensor, a specific biometric characteristic type can be determined. Therefore, when acquiring an image, the imaging element cooperates with a corresponding supplementary lighting source and imaging element parameter, so as to acquire high-quality biometric characteristic image information. Moreover, the image capturing device can acquire different types of biometric characteristic image information by using one imaging element, thus implementing rapid acquisition of different types of biometric characteristic image information. Moreover, the image capturing device avoids using multiple imaging elements, thus facilitating integration of the device.

Figure 9:
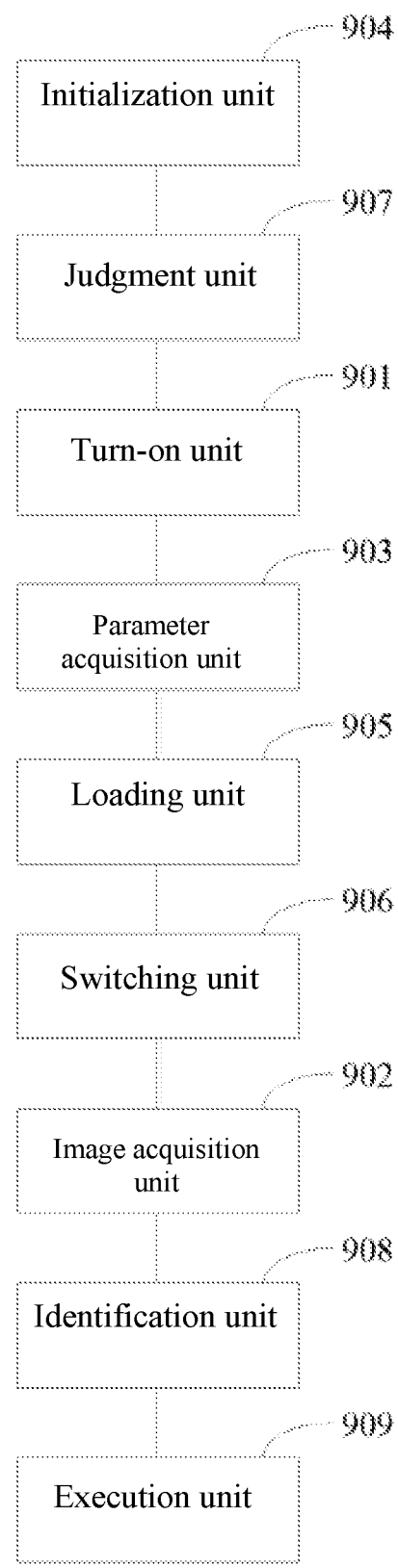
FIG. 9 is a schematic structural diagram of an image capturing device according to an embodiment of the present invention.

FIG. 9 is an image capturing device according to an embodiment of the present invention. The image capturing device includes an imaging element, a range sensor, a first supplementary lighting source and a second supplementary lighting source. The image capturing device is the image capturing device shown in FIG. 1a and FIG. 1b above. The image capturing device in the embodiment of the present invention can be used for executing the image capturing method shown in FIG. 5.

The image capturing device includes:

a turn-on unit 901 configured to turn on the first supplementary lighting source when it is detected through the range sensor that there is an object in a first capturing distance, the first supplementary lighting source being a light source for supplementarily lighting a first biometric characteristic; and an image acquisition unit 902 configured to acquire first biometric characteristic image information through the imaging element;

wherein the turn-on unit 901 is further configured to turn on the second supplementary lighting source when it is detected through the range sensor that there is an object in a second capturing distance, the second supplementary lighting source being a light source for supplementarily lighting a second biometric characteristic; and the image acquisition unit 902 is further configured to acquire second biometric characteristic image information through the imaging element.

Optionally, the device in the embodiment of the present invention further includes:

a parameter acquisition unit 903 configured to acquire a first imaging element parameter, the first imaging element parameter being an imaging element parameter adapted to imaging of the first biometric characteristic;

wherein the image acquisition unit 902 is further configured to acquire the first biometric characteristic image information through the imaging element by using the first imaging element parameter;

the parameter acquisition unit 903 is further configured to acquire a second imaging element parameter, the second imaging element parameter being an imaging element parameter adapted to imaging of the second biometric characteristic; and the image acquisition unit 902 is further configured to acquire the second biometric characteristic image information through the imaging element by using the second imaging element parameter.

Optionally, the device in the embodiment of the present invention further includes:

an initialization unit 904 configured to initialize the imaging element;

a loading unit 905 configured to load the first imaging element parameter to the initialized imaging element; and a switching unit 906 configured to switch the first imaging element parameter loaded on the initialized imaging element to the second imaging element parameter.

Optionally, the parameter acquisition unit 903 is further configured to call a pre-stored first imaging element parameter to initialize the imaging element; and the device in the embodiment of the present invention further includes: a switching unit 906, wherein the switching unit 906 is configured to switch the first imaging element parameter loaded on the initialized imaging element to the second imaging element parameter.

Optionally, the device in the embodiment of the present invention further includes: a judgment unit 907, wherein the image acquisition unit 902 is further configured to acquire first image prediction information through the imaging element;

the judgment unit 907 is configured to judge whether the first image prediction information is an image of the first biometric characteristic or a human body image; and if the first image prediction information is an image of the first biometric characteristic or a human body image, the turn-on unit 901 performs the step of turning on the first supplementary lighting source;

and/or the image acquisition unit 902 is further configured to acquire second image prediction information through the imaging element;

the judgment unit 907 is further configured to judge whether the second image prediction information is an image of the second biometric characteristic or a human body image; and if the second image prediction information is an image of the second biometric characteristic or a human body image, the turn-on unit 901 performs the step of turning on the second supplementary lighting source.

Optionally, the device in the embodiment of the present invention further includes: an identification unit 908 and an execution unit 909, wherein the identification unit 908 is configured to identify the first biometric characteristic image information to obtain a first identification result;

the identification unit 908 is further configured to identify the second biometric characteristic image information to obtain a second identification result; and the execution unit 909 is configured to execute a preset operation according to the first identification result and/or the second identification result.

Optionally, the biometric characteristic image information includes a face image, a palm image, an iris image and a fingerprint image, the first biological image and the second biometric characteristic image information each being one type of the biometric characteristic, and the supplementary lighting source includes a face supplementary lighting source, a palm supplementary lighting source, an iris supplementary lighting source, and a fingerprint supplementary lighting source, the first supplementary lighting source and the second supplementary lighting source each being one type of the supplementary lighting source.

Optionally, the imaging element is a CMOS with a resolution ratio greater than a preset threshold, the image capturing device further comprises a wide-angle optical lens, and the CMOS acquires images through the wide-angle optical lens.

In conclusion, the image capturing device includes an imaging element, a range sensor, a first supplementary lighting source and a second supplementary lighting source. When the image capturing device detects through the range sensor that there is an object in a first capturing distance, the turn-on unit 901 turns on the first supplementary lighting source, the first supplementary lighting source being a light source for supplementarily lighting a first biometric characteristic. Hence, the image acquisition unit 902 acquires first biometric characteristic image information through the imaging element. As such, the first biometric characteristic is illuminated by the first supplementary lighting source, so that the imaging element can acquire an image with high imaging quality. When the image capturing device detects through the range sensor that there is an object in a second capturing distance, the turn-on unit 901 turns on the second supplementary lighting source, the second supplementary lighting source being a light source for supplementarily lighting a second biometric characteristic. Hence, the image acquisition unit 902 acquires second biometric characteristic image information through the imaging element. As such, the second biometric characteristic is illuminated by the second supplementary lighting source, so that the imaging element can acquire an image with high imaging quality. Through the range sensor, a specific biometric characteristic type can be determined. Therefore, when acquiring an image, the imaging element cooperates with a corresponding supplementary lighting source, so as to acquire high-quality biometric characteristic image information. Moreover, the image capturing device can acquire different types of biometric characteristic image information by using one imaging element, thus implementing rapid acquisition of different types of biometric characteristic image information. Moreover, the image capturing device avoids using multiple imaging elements, thus facilitating integration of the device.

Those skilled in the art can clearly understand that, in order to make the description convenient and concise, for specific working processes of the system, apparatus and units described above, reference can be made to the corresponding processes in the foregoing method embodiment. Details are not described here again.

In the several embodiments provided in the present application, it should be understood that the disclosed system, apparatus and method may be implemented in other manners. For example, the apparatus embodiment described above is merely schematic. For example, the unit division is merely logical function division, and there may be other division manners in an actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between apparatuses or units may be implemented in an electronic form, a mechanical form, or other forms.

Units described as separate parts may or may not be physically separate, parts displayed as units may or may not be physical units, and they may be located at the same place, or distributed on multiple network units. The objective of the solution of the embodiment may be implemented by selecting some or all of the units according to actual requirements.

In addition, functional units in the embodiments of the present invention may be integrated in a processing unit, or the units may also exist physically separately, or two or more units may be integrated in one unit. The integrated unit may be implemented in the form of hardware or in the form of a software functional unit.

When the integrated unit is implemented in the form of a software functional unit and sold or used as an independent product, the integrated unit may be stored in a computer readable storage medium. Based on such an understanding, the technical solutions of the present invention essentially, or the part making contributions to the prior art, or some or all of the technical solutions may be implemented in the form of a software product. The computer software product may be stored in a storage medium and include several instructions for instructing a computer device (which may be a personal computer, a server, a network device, or the like) to execute all or some steps of the methods of embodiments of the present invention. The foregoing storage medium includes any medium that can store program codes, such as a USB flash drive, a mobile hard disk drive, a Read-Only Memory (ROM), a Random Access Memory (RAM), a magnetic disk, or an optical disc.

The embodiments described above are merely used for illustrating rather than limiting the technical solutions of the present invention. Although the present invention is described in detail with reference to the foregoing embodiments, those skilled in the art should understand that modifications may also be made to the technical solutions recorded in the foregoing embodiments, or equivalent replacements may also be made to some of the technical features. These modifications or replacements do not cause the essence of the corresponding technical solution to depart from the spirit and scope of the technical solutions of the embodiments of the present invention.

The invention claimed is:

1. A method implemented on at least one machine, each of which has at least one processor, storage, and a communication platform connected to a network for imaging biometric information, the method comprising:
    acquiring, if a range sensor detects that there is an object in a first capturing distance, image prediction information through an imaging element;
    judging whether the image prediction information corresponds to an image of a human body; and
    if the image prediction information is an image of a human body, turning on a first supplementary lighting source which is a light source for supplementarily lighting a first biometric characteristic;
    acquiring first biometric characteristic image information through the imaging element;
    turning on a second supplementary lighting source when the range sensor detects that the human body is in a second capturing distance, the second supplementary lighting source being a light source for supplementarily lighting a second biometric characteristic, wherein the second capturing distance is different than the first capturing distance; and
    acquiring second biometric characteristic image information through the imaging element.

2. The method according to claim 1, wherein the step of acquiring first biometric characteristic image information through the imaging element comprises:
    acquiring a first imaging element parameter adapted for imaging the first biometric characteristic; and
    acquiring the first biometric characteristic image information through the imaging element by using the first imaging element parameter.

3. The method according to claim 2, wherein the step of acquiring the first biometric characteristic image information through the imaging element by using the first imaging element parameter, further comprises:
    initializing the imaging element;
    loading the first imaging element parameter to the initialized imaging element; and
    obtaining the first biometric characteristic image information based on the imaging element with the loaded first imaging element parameter;
    switching, prior to acquiring the second biometric characteristic image information using the second imaging element parameter, the first imaging element parameter loaded on the initialized imaging element to the second imaging element parameter.

4. The method according to claim 1, wherein the step of acquiring the second biometric characteristic image information comprises:
    acquiring a second imaging element parameter adapted for imaging of the second biometric characteristic; and
    acquiring the second biometric characteristic image information through the imaging element by using the second imaging element parameter.

5. The method according to claim 1, wherein the step of acquiring first biometric characteristic image information through the imaging element further comprises:
    identifying the first biometric characteristic image information to obtain a first identification result;
    identifying the second biometric characteristic image information to obtain a second identification result; and
    executing a preset operation according to the first identification result and/or the second identification result.

6. The method according to claim 1, wherein
    the biometric characteristic image information comprises a face image, a palm image, an iris image, and a fingerprint image, the first biological image and the second biometric characteristic image information each being one type of the biometric characteristic, and
    the supplementary lighting source comprises a face supplementary lighting source, a palm supplementary lighting source, an iris supplementary lighting source, and a fingerprint supplementary lighting source, the first supplementary lighting source and the second supplementary lighting source each being one type of the supplementary lighting source.

7. The method according to claim 1, wherein the imaging element is a Complementary Metal-Oxide Semiconductor (CMOS) with a resolution ratio greater than a preset threshold, the image capturing device further comprises a wide-angle optical lens, and the CMOS acquires images through the wide-angle optical lens.

8. The method of claim 1, wherein the step of turning on the second supplementary lighting source further comprises:
    acquiring second image prediction information through the imaging element;
    judging whether the second image prediction information is an image of the second biometric characteristic or a human body image; and
    if the second image prediction information is an image of the second biometric characteristic or a human body image, performing the step of turning on the second supplementary lighting source.

9. A biometric imaging device, comprising:
    an imaging element;
    a range sensor;
    a judgment unit configured to judge whether an image prediction information, acquired by the imaging element when the range sensor detects that there is an object in a first capturing distance, corresponds to an image of a human body;
    a first supplementary lighting source;
    a second supplementary lighting source;
    a turn-on unit configured to turn on, when the image prediction information is judged to represent an image of a human body, the first supplementary lighting source which is a light source for supplementarily lighting a first biometric characteristic; and
    an image acquisition unit configured to acquire first biometric characteristic image information through the imaging element, wherein
    the turn-on unit is further configured to turn on the second supplementary lighting source when the range sensor detects that the human body is in a second capturing distance, the second supplementary lighting source being a light source for supplementarily lighting a second biometric characteristic, and the image acquisition unit is further configured to acquire second biometric characteristic image information through the imaging element, wherein the second capturing distance is different than the first capturing distance.

10. The device according to claim 9, further comprising:
a parameter acquisition unit configured to acquire a first imaging element parameter, the first imaging element parameter being an imaging element parameter adapted to imaging of the first biometric characteristic, wherein the image acquisition unit is further configured to acquire the first biometric characteristic image information through the imaging element by using the first imaging element parameter,
the parameter acquisition unit is further configured to acquire a second imaging element parameter, the second imaging element parameter being an imaging element parameter adapted to imaging of the second biometric characteristic, and
the image acquisition unit is further configured to acquire the second biometric characteristic image information through the imaging element by using the second imaging element parameter.

11. The device according to claim 10, further comprising:
an initialization unit configured to initialize the imaging element;
a loading unit configured to load the first imaging element parameter to the initialized imaging element; and
a switching unit configured to switch the first imaging element parameter loaded on the initialized imaging element to the second imaging element parameter.

12. The device according to claim 10, wherein the parameter acquisition unit is further configured to obtain a pre-stored first imaging element parameter to initialize the imaging element, and the device further comprises a switching unit, wherein the switching unit is configured to switch the first imaging element parameter loaded on the initialized imaging element to the second imaging element parameter.

13. The device according to claim 9, further comprising an identification unit configured to
identify the first biometric characteristic image information to obtain a first identification result, and
identify the second biometric characteristic image information to obtain a second identification result; and
an execution unit configured to execute a preset operation according to the first identification result and/or the second identification result.

14. The device according to claim 9, wherein the image acquisition unit is further configured to acquire second image prediction information through the imaging element;
the judgment unit is further configured to judge whether the second image prediction information is an image of the second biometric characteristic or a human body image; and
if the second image prediction information is an image of the second biometric characteristic or a human body image, the turn-on unit performs the step of turning on the second supplementary lighting source.

* * * * *